T. KRUGER.
SHUTTER OPERATING ATTACHMENT FOR CAMERAS.
APPLICATION FILED APR. 1, 1916.
1,225,652.
Patented May 8, 1917.
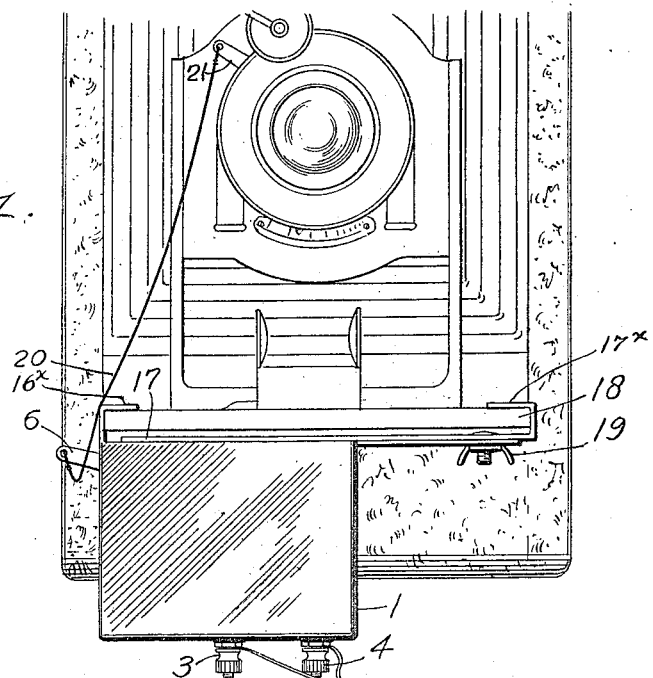
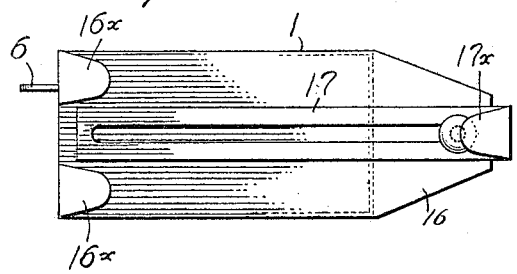
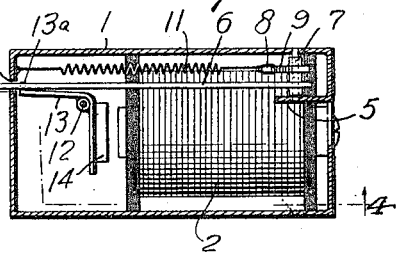
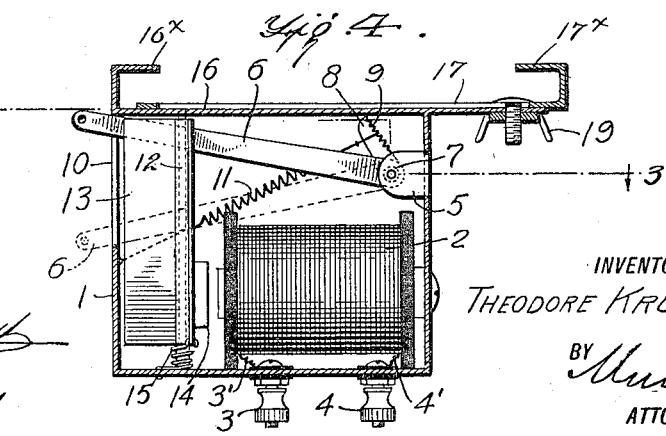
WITNESSES:
INVENTOR
THEODORE KRUGER,
BY
ATTORNEYS

UNITED STATES PATENT OFFICE.

THEODORE KRUGER, OF PEORIA, ILLINOIS.

SHUTTER-OPERATING ATTACHMENT FOR CAMERAS.

1,225,652. Specification of Letters Patent. Patented May 8, 1917.

Application filed April 1, 1916. Serial No. 88,312.

*To all whom it may concern:*

Be it known that I, THEODORE KRUGER, a citizen of the United States, and a resident of Peoria, in the county of Peoria and State of Illinois, have invented an Improvement in Shutter-Operating Attachments for Cameras, of which the following is a specification.

My invention relates to improvements in camera operating attachments, and it consists in the combinations, constructions and arrangements herein described and claimed.

An object of my invention is to provide a device by means of which a camera may be operated from a distance so that the owner of the camera may include himself in a group, after setting the camera in proper focus.

A further object of my invention is to provide an electric device for operating the shutter of a camera thereby obviating the necessity of using long cords or other similar mechanical devices, as when photographing wild animals.

A still further object of my invention is to provide a camera operating attachment which may be secured to any ordinary camera and which when placed in position will serve to actuate the shutter when the electric circuit is closed.

Other objects and advantages will appear in the following specification and the novel features of the invention will be particularly pointed out in the appended claims.

My invention is illustrated in the accompanying drawings forming part of this application in which—

Figure 1 is a front view of a camera showing my improved operating means attached thereto.

Fig. 2 is a plan view showing the attaching means.

Fig. 3 is a section along the line 3—3 of Fig. 4.

Fig. 4 is a section along the line 4—4 of Fig. 3.

In carrying out my invention I provide a casing 1 having therein a magnet 2 suitably insulated. Binding posts 3 and 4 are secured to the casing and to these two binding posts the terminals 3' and 4' of the magnet are attached.

Pivotally mounted on an ear or bracket 5 within the casing 1 is a lever 6, this lever being mounted on a stub shaft 7 which also bears an arm 8 having serrations 9. The outer end of the lever projects through a slot 10 in the casing 1. The arm 8 which in reality forms a portion of a bell crank lever together with the member 6 is placed under tension by means of a spring 11.

At 12 I have shown a shaft which forms the pivot pin of a trigger 13, one end $13^a$ of which extends normally underneath the arm 6 so as to hold the latter normally in an upper position against the tension of the spring 11. The trigger 13 is provided with an armature 14 disposed in close proximity to the pole of the magnet. A helical spring 15 tends to hold the trigger 13 in the path of the arm 6.

Means for attaching the shutter operating device to the camera consists of a plate 16 which in this instance is shown as forming one wall of the casing 1. This plate is provided with U-shaped engaging members $16^x$. To the face of the plate is slidably secured a slotted extension member 17 provided with a U-shaped attaching member $17^x$. From the foregoing description of the various parts of the device the operation thereof may be readily understood. The attachment is secured to the hinged front 18 of the camera by placing the suspending members $16^x$ and $17^x$ over the sides of the member 18 and then tightening the thumb screw 19. The arm 6 is raised against the tension of the spring 11 until the end $13^a$ of the trigger 13 drops in underneath it and holds it in position. A cord 20 is attached to the arm 6 and to the shutter operating lever 21.

When now the camera is focused it is only necessary to send a current through the magnet 2 by any suitable means. The movement of the armature 14 of the trigger 13 will withdraw the portion $13^a$ of the latter thereby permitting the spring 11 to pull the arm 6 downwardly and to operate the shutter through the medium of the cord 20 and the shutter lever 21.

The purpose of the serrations 9 on the arm 8 is to provide means for adjusting the tension of the spring 11 for different cameras.

The device is a simple one and consists of few parts and is, therefore, not liable to easily get out of order.

I claim:

1. In a shutter operating attachment for cameras, a casing, an electromagnet within the casing, a spring pressed arm carried by the casing, one end of said arm being arranged to project out of the casing, a spring pressed trigger for normally holding said arm against the tension of the spring, said trigger having an armature, and a flexible connection between said spring pressed arm and the shutter arm.

2. In a shutter operating attachment for cameras, a casing, a magnet disposed within the casing, an arm pivotally mounted within the casing and arranged to extend outside the casing, a second arm rigidly connected with said first-mentioned arm, a spring for exerting a tension on said second-mentioned arm, a pivotally mounted trigger having an armature disposed in close relation to the core of the magnet, one end of said trigger being arranged to extend in the path of said first-mentioned arm, and a spring for holding said trigger normally in the path of said first-mentioned arm.

3. In a shutter operating attachment for cameras, a casing, a magnet disposed within the casing, an arm pivotally mounted within the casing and arranged to extend outside the casing, a second arm rigidly connected with said first-mentioned arm, a spring for exerting a tension on said second-mentioned arm, a pivotally mounted trigger having an armature disposed in close relation to the core of the magnet, one end of said trigger being arranged to extend in the path of said first-mentioned arm, a spring for holding said trigger normally in the path of said first-mentioned arm, and adjustable means for attaching said casing to the camera.

4. In a shutter operating attachment for cameras, a casing, a magnet disposed within the casing, an arm pivotally mounted within the casing and arranged to extend outside the casing, a second arm rigidly connected with said first-mentioned arm, a spring for exerting a tension on said second-mentioned arm, a pivotally mounted trigger having an armature disposed in close relation to the core of the magnet, one end of said trigger being arranged to extend in the path of said first-mentioned arm, a spring for holding said trigger normally in the path of said first-mentioned arm, adjustable means for attaching said casing to the camera, and flexible connections between said first-mentioned arm and the shutter arm of the camera.

THEODORE KRUGER.

Copies of this patent may be obtained for five cents each, by addressing the "Commissioner of Patents, Washington, D. C."